(12) United States Patent
Goldish et al.

(10) Patent No.: US 10,018,298 B2
(45) Date of Patent: Jul. 10, 2018

(54) EXERCISE MACHINE AND METHOD FOR USE IN A SUPINE POSITION

(71) Applicant: U.S. Department of Veterans Affairs, Washington, DC (US)

(72) Inventors: Gary Goldish, Minneapolis, MN (US); Andrew Hansen, Minneapolis, MN (US); Eric Nickel, Minneapolis, MN (US); John Ferguson, Minneapolis, MN (US)

(73) Assignee: U.S. Department of Veterans Affairs, Washington, DC (US)

( * ) Notice: Subject to any disclaimer, the term of this patent is extended or adjusted under 35 U.S.C. 154(b) by 0 days.

(21) Appl. No.: 14/640,428

(22) Filed: Mar. 6, 2015

(65) Prior Publication Data
US 2016/0258573 A1 Sep. 8, 2016

(51) Int. Cl.
*A63B 22/00* (2006.01)
*A63B 71/00* (2006.01)
(Continued)

(52) U.S. Cl.
CPC ......... *F16M 11/42* (2013.01); *A63B 22/0002* (2013.01); *A63B 22/0005* (2015.10);
(Continued)

(58) Field of Classification Search
CPC ..... A63B 21/16; A63B 21/1672; A63B 21/22; A63B 21/068; A63B 22/0694;
(Continued)

(56) References Cited

U.S. PATENT DOCUMENTS 3,203,009 A * 8/1965 Lundberg ............. A61G 7/1017
5/87.1
3,693,614 A * 9/1972 Schon .................. A61H 1/0214
601/35
(Continued)

FOREIGN PATENT DOCUMENTS

| DE | 2121877 A1 * | 12/1972 | ......... A63B 22/0605 |
| EP | 2181687 A1 * | 5/2010 | ........... A61H 1/0292 |
| WO | WO 2014125513 A1 * | 8/2014 | ............. A63B 21/00 |

OTHER PUBLICATIONS

DE 2121877 A1 English Translation by ProQuest Dialog Oct. 3, 2016.*
(Continued)

*Primary Examiner* — Nyca T Nguyen
(74) *Attorney, Agent, or Firm* — Procopio Cory Hargreaves and Savitch LLP; Pattric J. Rawlins; Rosie Kim (57) ABSTRACT

An exercise machine has a mobile base and an upright support extending upwards from the mobile base. An upper support assembly extends forward from an upper portion of the upright support and an exercise device is suspended from the upper support assembly at a location spaced forward from the upright support. The mobile base has caster wheels and can be positioned from either side of a bed so as to extend partially under a bed with the upright support located on one side of the bed and the exercise device suspended over the bed in a position accessible by a patient lying supine in the bed for performing exercise. An anchoring system resists movement of the base for stability when exercise is performed.

17 Claims, 9 Drawing Sheets

(51) Int. Cl.
*F16M 11/42* (2006.01)
*A63B 22/06* (2006.01)
*B60B 33/00* (2006.01)
*F16M 11/24* (2006.01)
*F16M 11/18* (2006.01)
*A63B 71/02* (2006.01)
*A63B 71/06* (2006.01)
*A63B 21/005* (2006.01)
*A63B 21/008* (2006.01)
*A63B 21/055* (2006.01)
*A63B 21/16* (2006.01)
*A63B 21/22* (2006.01)
*A63B 23/035* (2006.01)
*A63B 23/04* (2006.01)
*A63B 23/12* (2006.01)
*A63B 21/00* (2006.01)
*A63B 21/062* (2006.01)

(52) U.S. Cl.
CPC ...... *A63B 22/0046* (2013.01); *A63B 22/0605* (2013.01); *A63B 22/0694* (2013.01); *A63B 71/0054* (2013.01); *A63B 71/023* (2013.01); *B60B 33/0089* (2013.01); *B60B 33/0092* (2013.01); *B60B 33/0094* (2013.01); *F16M 11/18* (2013.01); *F16M 11/24* (2013.01); *A63B 21/005* (2013.01); *A63B 21/0058* (2013.01); *A63B 21/00061* (2013.01); *A63B 21/00069* (2013.01); *A63B 21/0083* (2013.01); *A63B 21/0087* (2013.01); *A63B 21/0552* (2013.01); *A63B 21/0628* (2015.10); *A63B 21/16* (2013.01); *A63B 21/225* (2013.01); *A63B 22/0007* (2013.01); *A63B 22/0076* (2013.01); *A63B 23/03525* (2013.01); *A63B 23/0405* (2013.01); *A63B 23/1209* (2013.01); *A63B 71/0009* (2013.01); *A63B 71/0622* (2013.01); *A63B 2022/0623* (2013.01); *A63B 2071/025* (2013.01); *A63B 2208/0252* (2013.01); *A63B 2210/04* (2013.01); *A63B 2225/09* (2013.01); *A63B 2225/093* (2013.01)

(58) Field of Classification Search
CPC ............ A63B 22/06; A63B 2208/0242; A61H 2001/0203; A61H 2001/2011; A61H 2001/2014; A61H 7/10; A61H 7/104; A61H 7/1046; A61H 7/4048
See application file for complete search history.

(56) References Cited

U.S. PATENT DOCUMENTS

| | | | | |
|---|---|---|---|---|
| 3,694,829 A * | 10/1972 | Bakker | ................ | A61G 7/1017 5/86.1 |
| 3,848,870 A * | 11/1974 | Craig | ................. | A63B 22/0605 108/140 |
| 4,976,426 A * | 12/1990 | Szabo | ............. | A63B 21/00178 482/111 |
| 5,005,829 A * | 4/1991 | Caruso | ............... | A63B 21/4047 482/112 |
| 6,457,700 B1 * | 10/2002 | Hong | ..................... | B66C 23/48 254/124 |
| 7,004,454 B2 * | 2/2006 | Petrone | ................. | B66F 7/0625 254/10 B |
| 9,044,630 B1 * | 6/2015 | Lampert | .............. | A63B 23/035 |
| 2002/0157617 A1 * | 10/2002 | Reinkensmeyer | ... | A01K 15/027 119/728 |
| 2005/0119095 A1 * | 6/2005 | Kramer | .................... | A61H 1/02 482/130 |
| 2009/0060473 A1 * | 3/2009 | Kohte | .................. | F16M 11/041 386/200 |
| 2010/0113233 A1 * | 5/2010 | Chen | .................... | A61H 1/0292 482/133 |
| 2012/0000496 A1 * | 1/2012 | Razon | ..................... | A61H 3/04 135/67 |
| 2013/0318708 A1 * | 12/2013 | Wang | ................... | A61G 7/1003 5/87.1 |
| 2015/0099614 A1 * | 4/2015 | Tekulve | ............ | A63B 69/0064 482/139 |
| 2015/0165256 A1 * | 6/2015 | Salamon | ........... | A63B 21/0442 482/129 |
| 2016/0016036 A1 * | 1/2016 | Barriskill | ............. | A61H 1/0214 482/5 |

OTHER PUBLICATIONS

Bamman et al., "Impact of resistance exercise during bed rest on skeletal muscle sarcopenia and myosin isoform distribution", J. Appl. Physiol. (1998) 84(1):157-163.

Ferrando et al., "Resistance exercise maintains skeletal muscle protein synthesis during bed rest", J. Appl. Physiol. (1997) 82(3):807-810.

Figoni, "Exercise responses and quadriplegia", Med Sci Sports Exerc. (1993) 25(4): 433-441.

Hooker et al., "Influence of posture on arm exercise tolerance and physiologic responses in persons with spinal cord injured paraplegia", Eur J Appl Physiol. (1993) 67(6):563-566.

Lode Holding Company, "Angio rehab—with electrical adjustable wall fixation: Modern ergometer with multifunctional applications", (2014) http://web.archive.org/web/20140602074046/http:/lode.nl/en/segments/rehabilitation/4, in 1 page.

Nickel et al., "Upper Limb Cycle Ergometer for Supine Exercise", ASME Journal of Medical Devices (2013) vol. 7, No. 2, 020910.

Nickel et al., "Upper Limb Cycle Ergometer for Supine Exercise", Submitted as poster and technical brief to 2013 ASME Design of Medical Devices Conference, Apr. 8-11 (2013), Minneapolis, MN.

Rodby Innovation, "Ergometer bicycle", Ergometer bicycle system RE 990S, (2014) http://web.archive.org/web/20140920103625/http:/www.rodby.com/products/ergometer-bicycle/, in 2 pages.

Shteingardt et al., "Hand ergometer for bedridden patients", Biomedical Engineering (1974) 8(5): 301-302.

* cited by examiner

EXERCISE MACHINE AND METHOD FOR USE IN A SUPINE POSITION

BACKGROUND

Field of the Invention

The present invention relates generally to exercise machines or apparatus and methods for use by persons who are in a supine position in bed, for example patients on bed rest or others who prefer exercising in this position for safety, more comfort, pain relief or the like.

Related Art

Exercise is widely accepted as an important element in maintaining health and wellness. Many exercise machines exist to provide users with a variety of movements, such as treadmills, stationary cycles, arm ergometers, weight lifting machines, and the like. Most exercise machines are used in ways that create complex movements and loading to the machines. For this reason, exercise machines are typically mounted on stable structural bases that stand on the floor and are immobile. In addition, most exercise machines are designed for exercise in a standing or seated position and generally remain in a room or gym that a user must go to for exercise.

Prolonged bed rest and immobilization are used in the medical treatment of several conditions in an effort to allow a patient's body to heal from injury or surgery, for example spinal cord injury. However, prolonged bed rest can lead to significant loss of muscle strength, and can negatively affect health in other ways as well as lengthening recovery time after healing. The cardiovascular and respiratory systems are also affected by long periods of bed rest. Exercise is therefore an important activity to alleviate the long term negative health effects of prolonged bed rest. However, most exercise machines are not suitable for use by a person in a supine position.

As an example, many arm ergometers (also known as UBE or upper body ergometers) are currently available on the market, but none are able to be used by a person lying in a supine position in a hospital bed. A previous study described a hand ergometer for bedridden patients (Shteingardt, et al, Meditsinskaya Tekhnika, No. 5, pp. 41-42, 1974) which had a mounting fixture for the foot end of a bed. The patient performs a rowing motion to lift a weight on the fixture, while lying supine in bed. Such an exercise is not appropriate for patients with spinal cord injury or other patients bedridden for extended periods of time, due to shear on the tissues of the back, buttocks and legs, placing patients at greater risk of developing pressure ulcers. The mounting fixture would also be difficult to mount on different types of hospital beds due to variation in hospital bed sizes and foot end structures, and demounting and remounting was required to move the device from patient to patient.

There are some commercially available devices which allow exercise in a supine position, specifically the Angio made by Lode BV of Groningen, Netherlands, and the RE 990S made by Rodby Innovation AB of Vange, Sweden. Both of these devices are only designed for lower limb pedaling exercise when a user is in a supine position, and are not designed for upper limb exercise while supine in a hospital bed.

Prior exercise machines for use when lying supine in a bed have disadvantages such as instability during exercise because of the mounting or support arrangement, and difficulty in moving the machines from one bed to another.

SUMMARY

In order to allow upper limb exercise by a patient or exerciser while lying supine, an exercise machine is provided which comprises a mobile base having a forward end and a rear end, an upright support extending upwards from the mobile base, an upper support assembly extending forward from an upper portion of the upright support, and an exercise device suspended from the upper support assembly at a location spaced forward from the upright support, the mobile base being configured for positioning to extend partially under a bed with the upright support located on one side of the bed and the exercise device suspended over the bed in a position accessible by a patient in the bed to perform exercise. In one aspect, the mobile base has a plurality of caster wheels and an anchoring system configured to prevent or resist movement of the mobile base during performance of exercise.

In one aspect, the anchoring system is configured to raise some or all of the wheels off the floor to provide a stable base during performance of exercise. In one aspect, the anchoring system comprises plurality of expandable feet on the mobile base which are movable between a raised, inoperative position and a lowered, ground-engaging or operative position in which the caster wheels are raised from the ground. In an alternative aspect, the anchoring system comprises remotely activated wheel locks associated with the caster wheels, providing mobility to the base when unlocked and providing stability to the base when locked, without the need to lift the caster wheels from the ground. Both alternatives provide a stable base during performance of exercise. In one aspect, the expandable feet or remotely lockable casters may be actuated to move back and forth between the inoperative and operative positions by a foot pedal, hand lever or other manually operable device.

The exercise device may be an active or passive exercise device and may be configured for performance of arm or leg exercises, and may be an aerobic exercise device or a weight lifting/strength exercise device. The exercise device may be an arm ergometer, rowing exerciser, press-up exercise device, pull down exercise device, bicep curl, chest press, shoulder press, pec fly, leg extension, leg press, leg ergometer, or the like.

According to another aspect, the upper support assembly comprises a four bar pivot linkage between an upper portion of the upright support and a support for the exercise device, to allow the height of the exercise device above the bed to be adjusted. A suitable actuator or drive such as a gas spring controls rotation of the four bar pivot linkage about the respective pivot axes for height adjustment. According to another aspect, a counterbalance device or counterweight is associated with the four bar pivot linkage to move the exercise device away from the patient as a fail-safe mechanism when the gas spring is released.

A load may be associated with the exercise device for providing exercise resistance. A monitor or computer tablet device may be mounted at a suitable location on a part of the exercise device which does not move during exercise, facing the patient or user lying supine in the bed so that they can monitor exercise performance such as duration, repetitions, or intensity, or watch entertainment media while exercising.

The mobile base of the exercise machine or apparatus allows an exercise device to be moved freely between patients or other individuals lying supine in bed while the anchoring system is in an inoperative position, and easily slides partially under a bed until the upright support is adjacent the side of the bed with the exercise device suspended at a selected exercise position over the bed for access by the patient. Once in the proper position for use by the patient, the base can be locked in place by deployment of the anchoring system with caster wheels raised from the ground, providing a stable platform or base which is capable of handling complex movements and loading associated with exercise machines, resisting rocking or wobbling of the apparatus while a patient is performing exercise.

Other features and advantages will become more readily apparent to those of ordinary skill in the art after reviewing the following detailed description and the accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for an exercise machine or apparatus configured for allowing patients or exercisers lying in a supine position in a bed to perform exercises. In one embodiment, the apparatus includes a stable base which has caster wheels for transporting the apparatus to a desired position at a bed and an anchoring system to raise the caster wheels from the ground when the desired position is reached so that stability is maintained and wobbling during exercise performance is reduced or eliminated.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
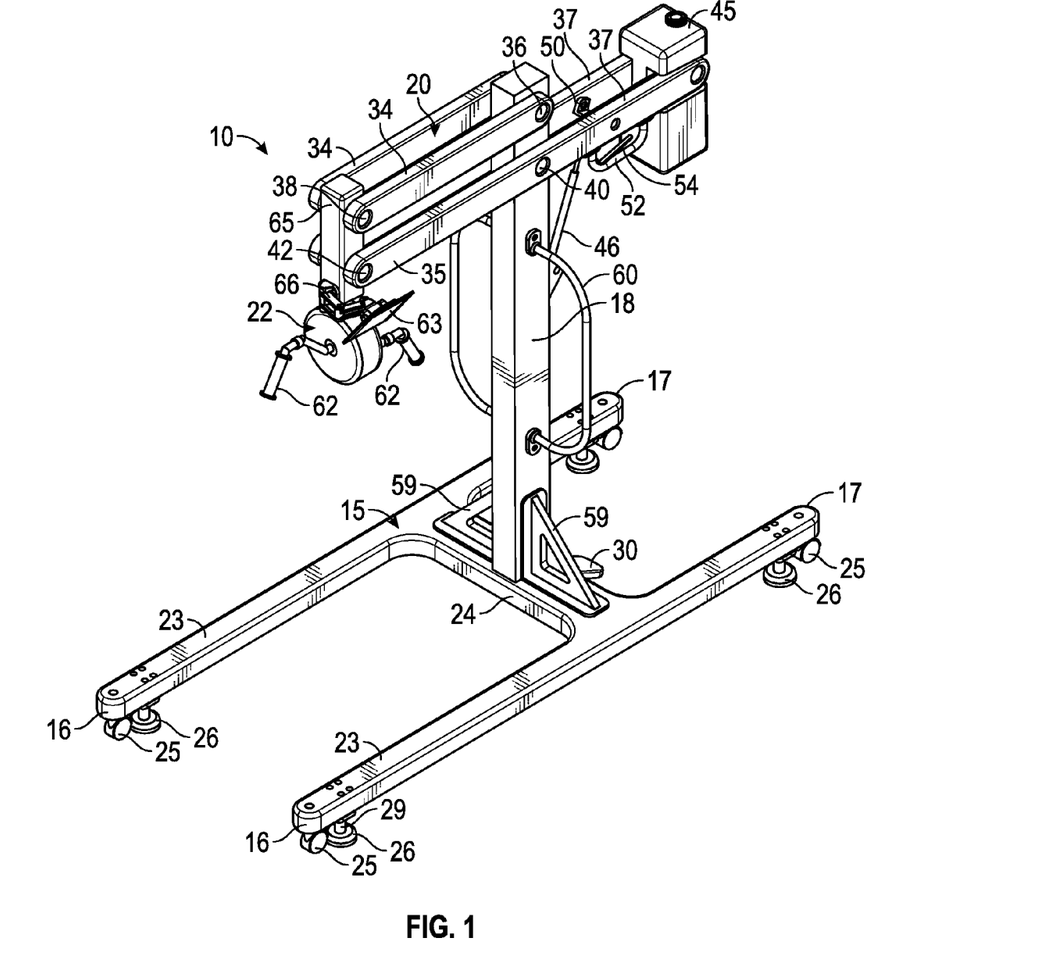
FIG. 1 is a perspective view of one embodiment of an exercise machine configured to allow performance of exercise by a user lying supine in a bed.
Figure 2:
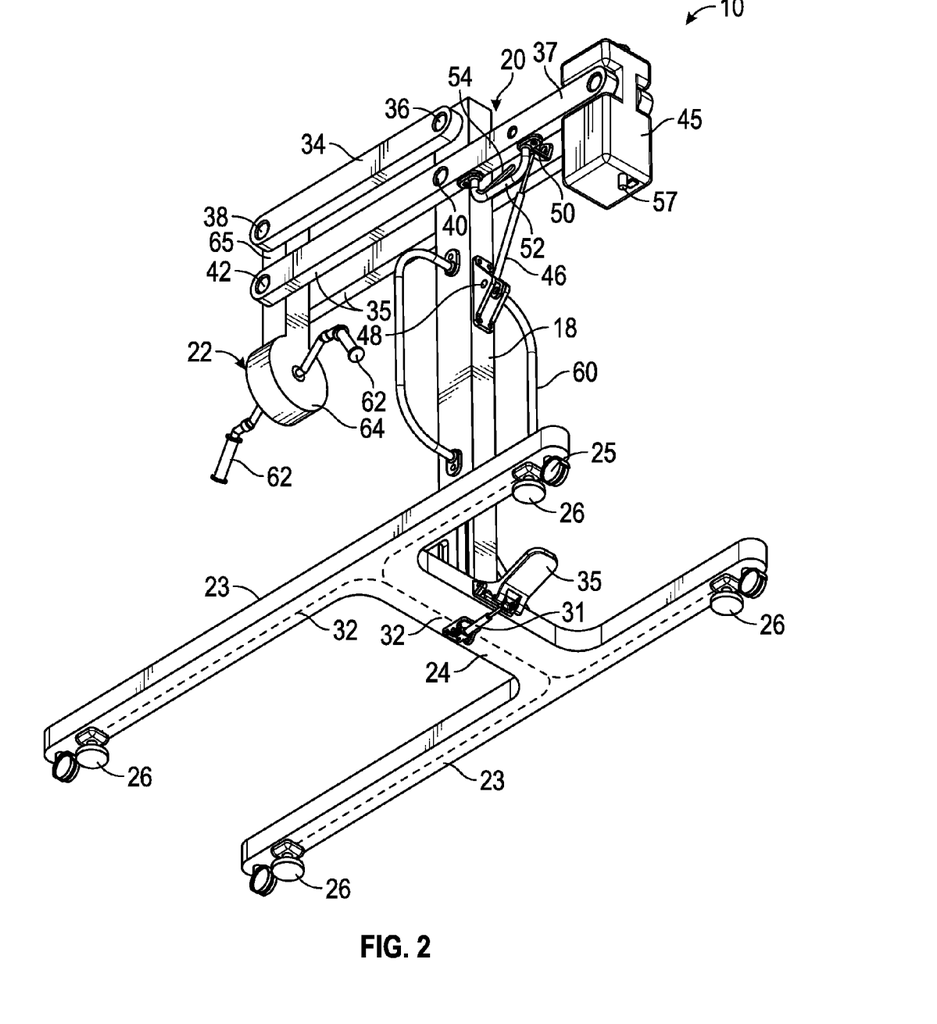
FIG. 2 is a bottom perspective view of the exercise machine of FIG. 1 without the video monitor.
Figure 5:
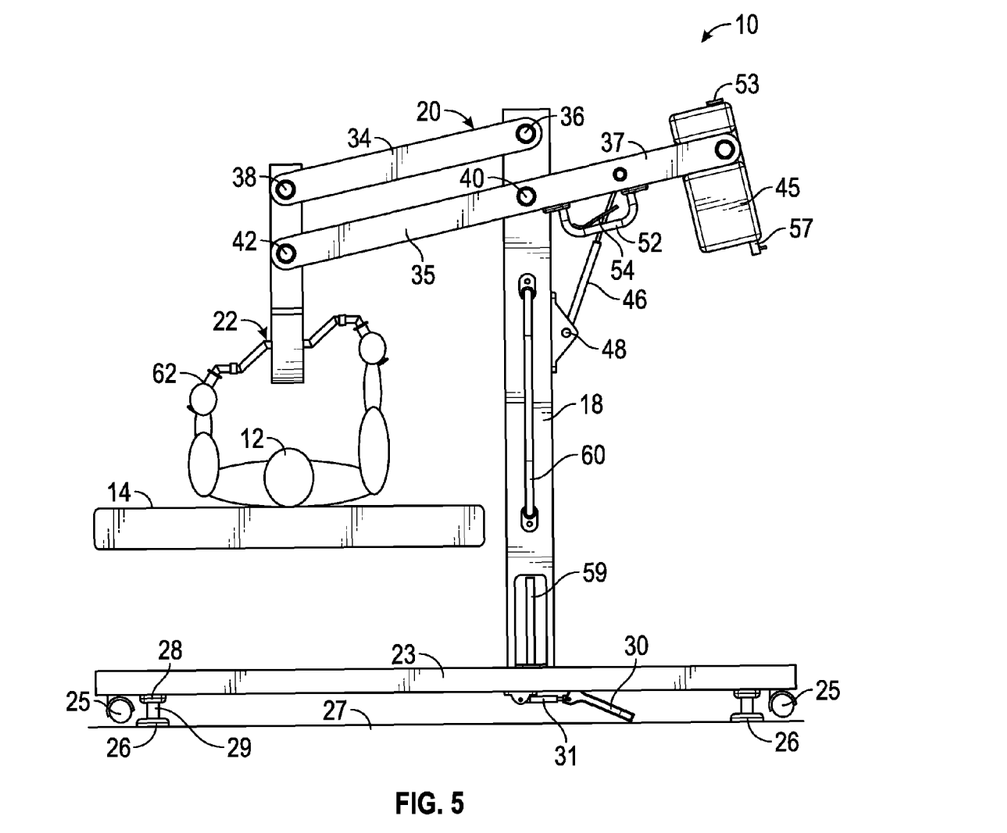
FIG. 5 is a side elevation view similar to FIG. 4 but with the machine in a locked position at a patient's bed for performance of exercise in a supine position, and with the exercise device at an adjusted, lower height.

FIGS. 1 to 6 illustrate a first embodiment of an exercise machine 10 which allows performance of exercise by patients or others 12 lying supine in a bed 14, such as a hospital bed, as illustrated schematically in FIG. 5. As best illustrated in FIGS. 1 and 2, the machine basically comprises a mobile support base or base frame 15 having a forward end 16 and a rear end 17, an upright support or column 18 extending upwards from a rear portion of the mobile base, an upper support assembly 20 extending in a generally forward direction from an upper portion of the upright support 18 above the base, and an exercise device 22 suspended from the upper support assembly at a location spaced forward from the upright support. The mobile base 15 is configured for positioning to extend partially under a bed 14 with the upright support 18 located on one side of the bed 14 and the exercise device 22 suspended over the bed in a position accessible by a patient in the bed to perform exercise, as illustrated schematically in FIG. 5.

Figure 6:
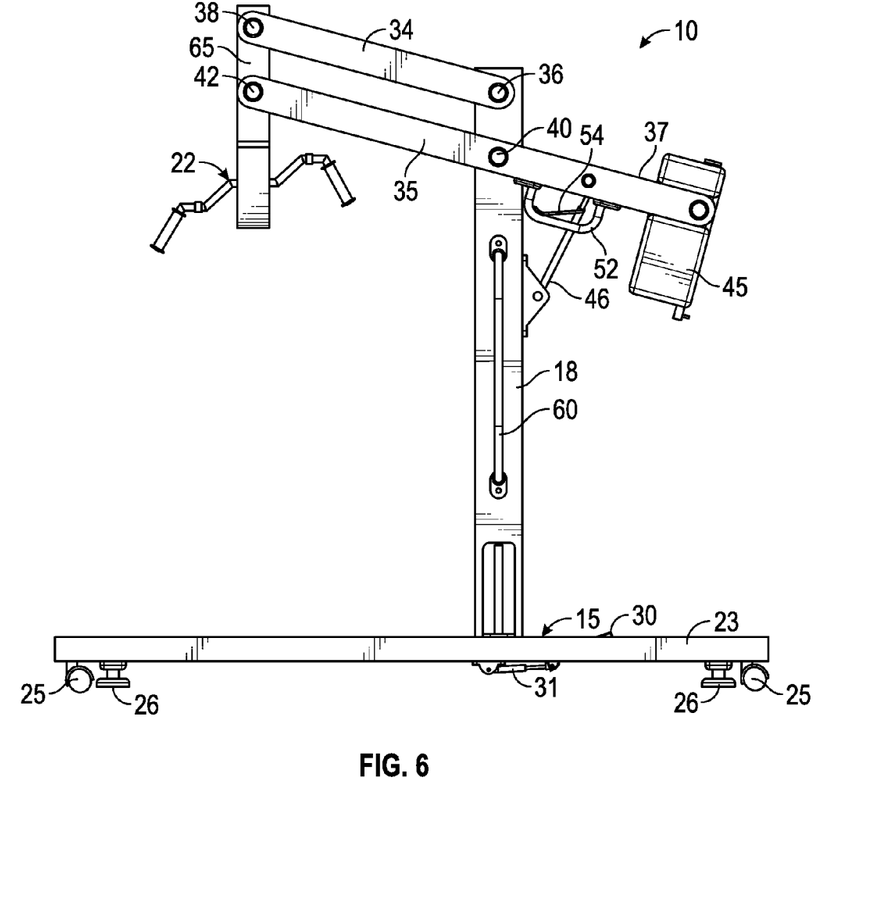
FIG. 6 is a side elevation view similar to FIGS. 4 and 5 but with the exercise device in a raised position.

In this embodiment, the upper support assembly 20 is an adjustment device configured for selective adjustment of the height of the exercise device. In the illustrated embodiment, the adjustment device comprises a four bar pivot linkage, which allows the exercise equipment or device 22 to be raised and lowered over the patient or exerciser for optimum positioning based on the patient's arm length or the like, without changing the orientation of the exercise device over the patient or reducing stability. FIGS. 1 to 4 illustrate the exercise device 22 at a first height, FIG. 5 illustrates the exercise device 22 in a lowered position over a bed 14, and FIG. 6 illustrates the exercise device in a raised position. As best illustrated in FIGS. 1 and 2, the four bar pivot linkage 10 has upper and lower spaced pairs of parallel links 34, 35. The upper links 34 extend between the upper end portion of support or column 18 and the upper end portion of a support bar or forward support 65 from which exercise device 22 is suspended, and have a first pivot connection 36 to the upright 18 at one end and a second pivot connection 38 to the forward support 65 at the other end. The lower links 35 are longer than the upper links and have rear portions 37 which extend rearward from the upright support or column 18, and are secured to a counterweight 45 at their rear ends. Lower links 35 have a third pivot connection 40 to the upright support 18 spaced below first pivot connection 36, and a fourth pivot connection 42 to the forward support 65 spaced below the second pivot connection 38. The four bar linkage system has pivot joints with tight tolerance and allows the exercise device to be raised and lowered easily in a vertical direction, while resisting rotation and mechanical play. Once locked in position, the structurally stable linkage system helps to maintain the body of the exercise device in a vertical position centered above the exerciser or patient during complex movements and loading associated with performance of the exercise.

Figure 3:
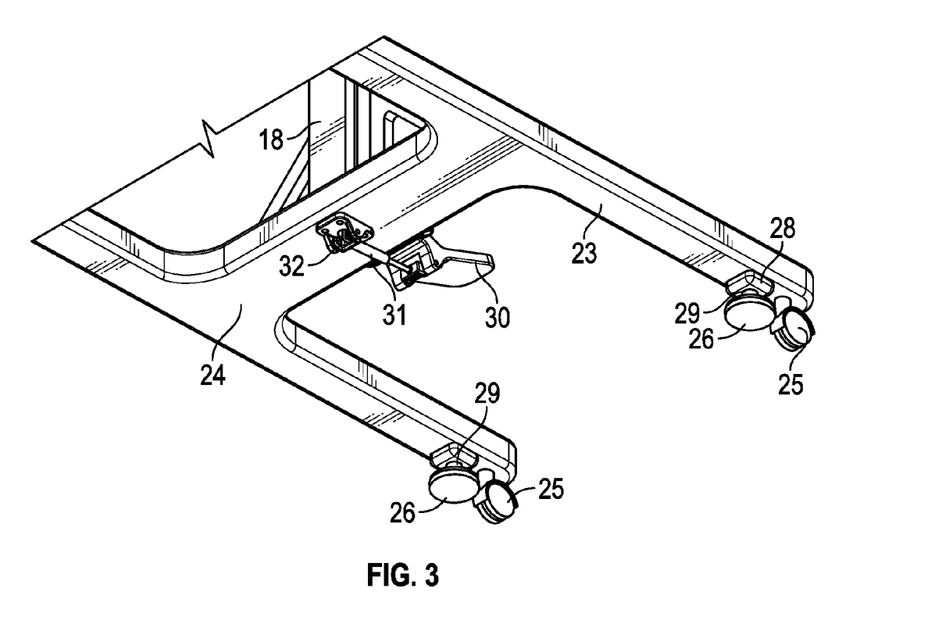
FIG. 3 is an enlarged view of part of the base of the exercise machine of FIG. 2, illustrating the linkage between an actuator pedal and the extendable anchors or foot pads.
Figure 4:
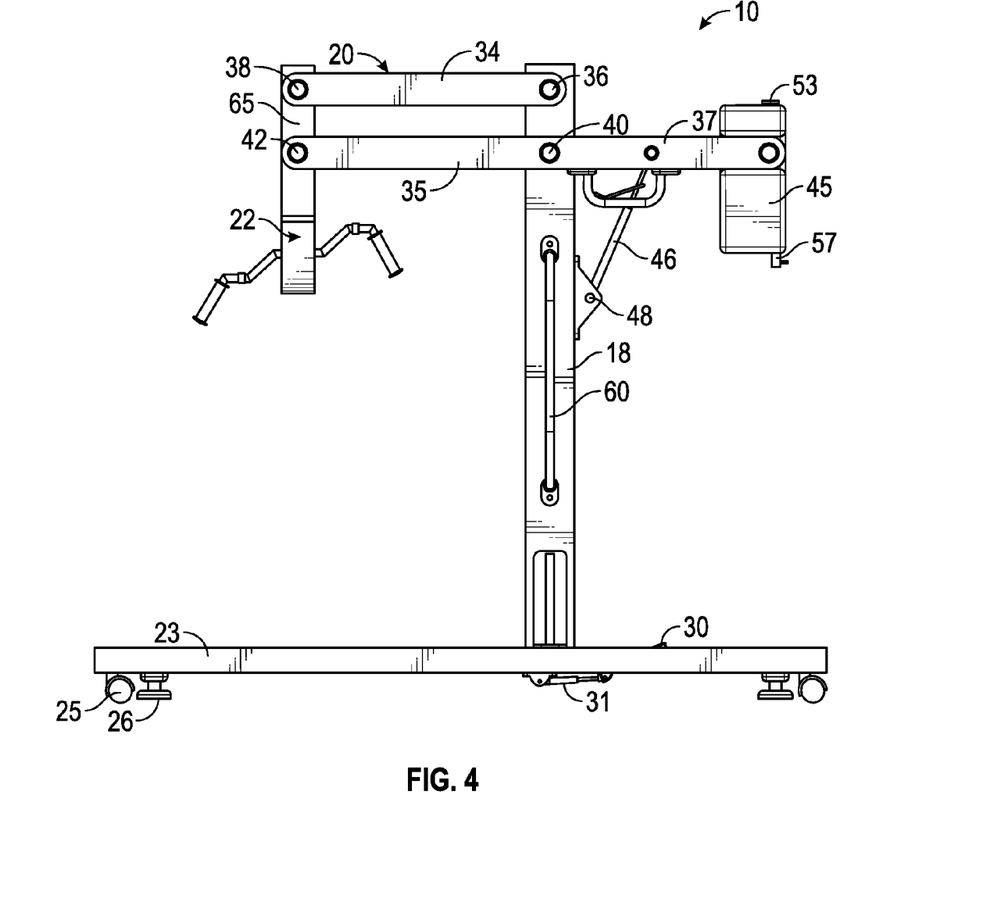
FIG. 4 is a side elevation view of the exercise machine of FIGS. 1 to 3, with the exercise device at a first height.

In the illustrated embodiment, the feet are secured to piston rods 29 extending from hydraulic cylinders 28 to move back and forth between the inoperative and operative positions, as best illustrated in FIG. 3. In this embodiment, a foot pedal 30 driving input or supply cylinder 31 is pivotally mounted on the cross bar 24 of the H-shaped frame and extends towards the rear end of the frame, as illustrated in FIGS. 2 to 5. Foot pedal 30 controls actuation of the expanding feet via hydraulic lines 32 extending through the center support 24 and side bars 23 of the frame between the supply cylinder and feet, as illustrated in dotted lines in FIG. 2, but other actuators may be used in alternative embodiments. In the illustrated embodiment, pedal 30 is pushed down to extend the feet or anchors into an operative position (FIG. 5), and the pedal is raised to retract the feet to a raised position when the machine is to be moved to a new location. The pedal may be releasably locked in the lowered position of FIG. 5 when the exercise device is in use or in storage and may be released and spring loaded back to the raised position when the machine is to be moved to a new location. The caster wheels 25 may all be non-locking wheels. Alternatively, some of the wheels may be lockable in some embodiments, such as the rear wheels.

In this embodiment, the upper support assembly 20 is a four bar pivot linkage, which allows the exercise equipment or device 22 to be raised and lowered over the patient for optimum positioning based on the patient's arm length or the like, without changing the orientation of the exercise device over the patient or reducing stability. FIGS. 1 to 4 illustrate the exercise device 22 at a first height, FIG. 5 illustrates the exercise device 22 in a lowered position over a bed 14, and FIG. 6 illustrates the exercise device in a raised position. As best illustrated in FIGS. 1 and 2, the four bar pivot linkage 20 has upper and lower spaced pairs of parallel links 34, 35. The upper links 34 extend between the upper end of support or column 18 and the upper end of a support bar or forward support 65 from which exercise device 22 is suspended, and have a first pivot connection 36 to the upright 18 at one end and a second pivot connection 38 to the forward support 65 at the other end. The lower links 35 are longer than the upper links and have rear portions 37 which extend rearward from the upright support or column 18, and are secured to a counterweight 45 at their rear ends. Lower links 35 have a third pivot connection 40 to the upright support 18 spaced below first pivot connection 36, and a fourth pivot connection 42 to the forward support 65 spaced below the second pivot connection 38. The four bar linkage system has pivot joints with tight tolerance and allows the exercise device to be raised and lowered easily in a vertical direction, while resisting rotation and mechanical play. Once locked in position, the structurally stable linkage system helps to maintain the body of the exercise device in a vertical position centered above the user during complex movements and loading associated with performance of the exercise.

In the illustrated embodiment, a user releasable gas spring 46 is pivotally connected between pivot connection 48 on upright column 18 spaced below the four bar pivot linkage and a pivot bracket 50 extending between the rear portions 37 of the lower pivot links 35, as best illustrated in FIG. 2. Gas spring may be extended or retracted to adjust the angle of the four bar pivot linkage and thus the height of the exercise device 22 above the bed 14, and to lock the exercise device in a selected raised position. An alternative drive mechanism for adjusting the angle may be used in other embodiments, such as a drive motor or the like. A handle 52 on the rear portion of one of the lower pivot links 35 incorporates a remote release button or lever 54 for the gas spring 46. Counterweight 45 urges the pivot linkage and the attached exercise device to move upward and away from the patient for safety when released, as illustrated in FIG. 6. Any counterweight may be used, but in the illustrated embodiment counterweight 45 is a reservoir or tank which may be filled to a desired level through an upper supply inlet after removing stopper or cap 53, and the amount of fill or the weight may be adjusted by opening drain 57 on the lower wall of counterweight 45. This allows adjustment of the tank weight and therefore the balance of the four bar pivot linkage, which may be helpful when lighter or heavier exercise equipment is to be used, for example if the exercise equipment is interchangeable with other lighter or heavier pieces of equipment, or when other elements such as monitors, game systems, controllers, or different handles affect the mass suspended from the forward end of the four bar linkage. In another embodiment, the counterweight can be designed on a sliding mechanism along the rear portions 37 of the lower links 35, creating a shorter or longer movement arm of the weight from the pivot connection 40.

Figure 1A:
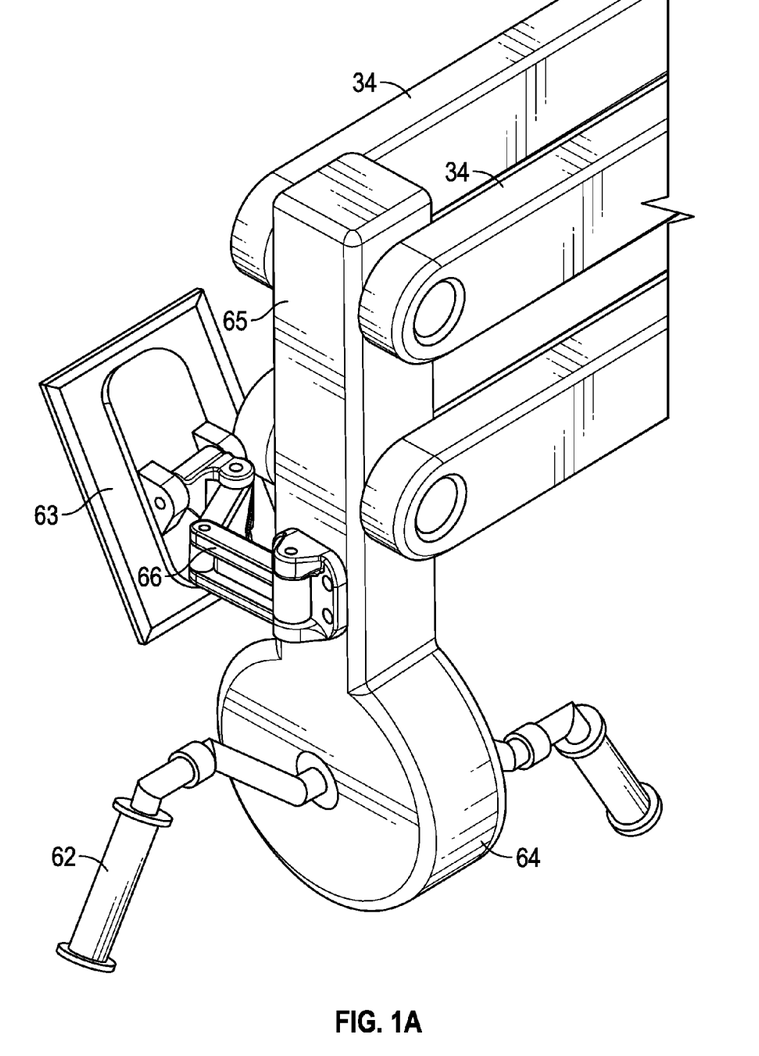
FIG. 1A is a perspective view of the exercise device and support of FIG. 1 with the video monitor facing in the opposite direction to allow viewing when the exercise machine is positioned on the opposite side of the bed.

In the illustrated embodiment, exercise device 22 is an arm cycle ergometer with handles 62 for gripping by a user 12 while performing exercise, as illustrated in FIG. 5. The handles may be fixed or may be adjustable via a crank mechanism for varying crank offset and width and handle angle. In one embodiment, display device or video monitor 63 such as a tablet computer may be mounted on support bar 65 or central hub 64 of the exercise device via articulated arm 66, as illustrated in FIG. 1, and is positioned to face a user in a bed when the machine is in the operative position relative to the bed. The articulated mounting arm 66 allows the monitor to be placed facing the patient on either side of support bar 65, as illustrated in FIG. 1 and FIG. 1A. This allows the exercise machine to be positioned from either side of the bed with the exercise device over the patient. This is an important option because many hospital beds are accessible from only one side, for example beds located adjacent a wall. The articulated arm mount of the video monitor or tablet computer allows the exercise machine to be placed on either side of the bed without impacting the user experience. Tablet computer or monitor 63 may be used to monitor exercise performance such as duration, repetitions, or intensity, or may be linked to entertainment media for watching by the user while exercising. Controls for the display may be conveniently mounted on or near handles 62. In one example, a rotary encoder for measuring cycling speed has an output linked to monitor 63. A pressure sensor or the like may be linked to monitor 63 in one embodiment to measure cycling torque or resistance.

Any type of adjustable exercise resistance or load may be provided for applying a load when exercise is performed, such as a compact hydraulic resistance system (not illustrated) which may be located in housing 64 of exercise device 22 and linked through hydraulic lines extending through pivot links 34, 35 and column 18 to a supply tank in the base of the device. Other alternative resistance mechanisms include flywheels or other types of resistance such as pneumatic, electromagnetic, elastic bands, flex rods, weight plates, or a selectorized weight stack in column 18.

In this embodiment, the exercise machine 10 can be easily moved from one location to another via mobile base 15 with the anchors or feet 26 in the raised position and the caster wheels 25 contacting the ground 27, as illustrated in FIGS. 1 to 3, and the operator may stand between the rear end portions of base side bars 23 while gripping handles 60 to push the machine. The forward end of the base is then pushed under a bed 14 as illustrated in FIG. 5, with the exercise device 22 suspended above the bed and upright post or column 18 adjacent one side of the bed. Once the machine is properly positioned with the exercise device 22 above a patient in the bed, pedal 30 is engaged to deploy anchors or feet 26, raising the caster wheels from the ground as seen in FIG. 5. The height of exercise device 22 is then adjusted using gas spring 46 until it is at a comfortable height for access by the user or patient 12. The base with multiple ground engaging feet provides a stable platform which is capable of handling complex movements and loading associated with performance of exercise on an arm ergometer or the like, avoiding or reducing shaking or unstable movements of the device during exercise. This provides a stable base for pedaling at all intensity levels. Simple locking casters only work for low impact pedaling and provide insufficient stability for more intense exercise. The base is designed to be the heaviest component of the system and provides a low center of mass for the system for increased stability. The upright support or column 18 is rigidly secured to the base with added support from triangular braces 59, further resisting any shaking or unstable movement of the exercise device regardless of intensity of use. By providing a display or tablet computer 63 which is visible in the supine position, the user has immediate feedback on exercise performance which may provide motivation and interest to continue exercise for longer time periods.

The four bar pivot linkage provides for easy and smooth adjustment to raise and lower the exercise device over a bed while maintaining the same orientation relative to the user, until a desired exercise height is reached. The exercise device is integrated with the structural components of the device (base, tower, and overhead support) for added stability and strength, rather than being a separate device which is releasably attached to a support as was common in the past. The four bar pivot linkage itself could also be used as part of the exercise program. For example, a physical stop may be added to limit the downward rotation of the pivot linkage in the direction of the user, thus protecting the user, and the counterweight can be adjusted so that the four bar pivot linkage system provides a bench press exercise system that the user pushes away from their body.

Figure 7:
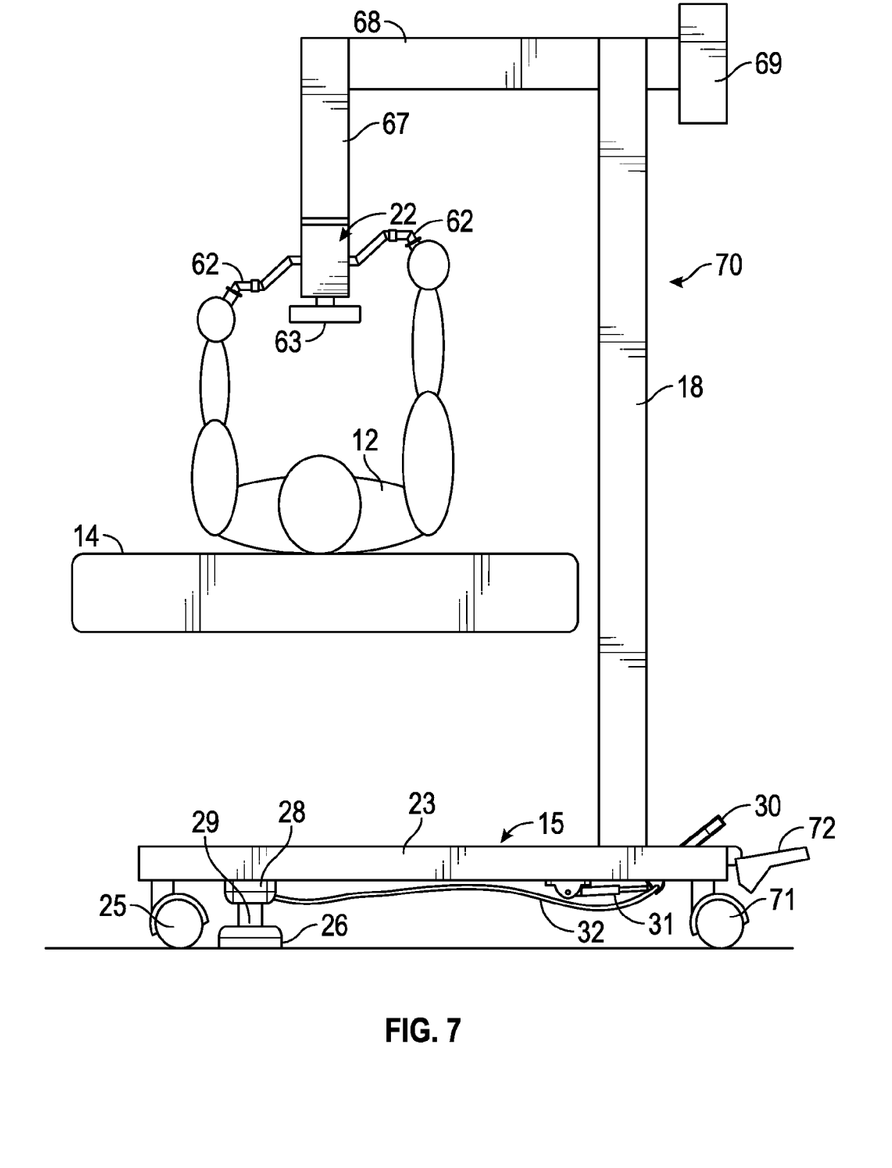
FIG. 7 is a schematic side elevation view of a simplified embodiment of the exercise machine.

Although a height adjustable exercise device is illustrated in FIGS. 1 to 6, the exercise device may be at a fixed height in a simpler alternative embodiment, as illustrated FIG. 7. Some parts of the exercise machine 70 of FIG. 7 are identical to those of the previous embodiment, and like reference numbers are used for like parts as appropriate. In this embodiment, the exercise machine 70 has an exercise device 22 similar to that of FIGS. 1 to 6, but the exercise device is suspended from a vertical support post 67 extending downward from a forward end of a fixed overhead support 68 which is permanently secured at a fixed height on upright column or tower 18. One example of a resistance mechanism or flywheel 69 is illustrated schematically in FIG. 7. In this embodiment, anchors or extendable feet 26 are provided only in the forward portion of the mobile base, and rear caster wheels 71 are associated with caster wheel locks or brakes 72.

Figure 8:
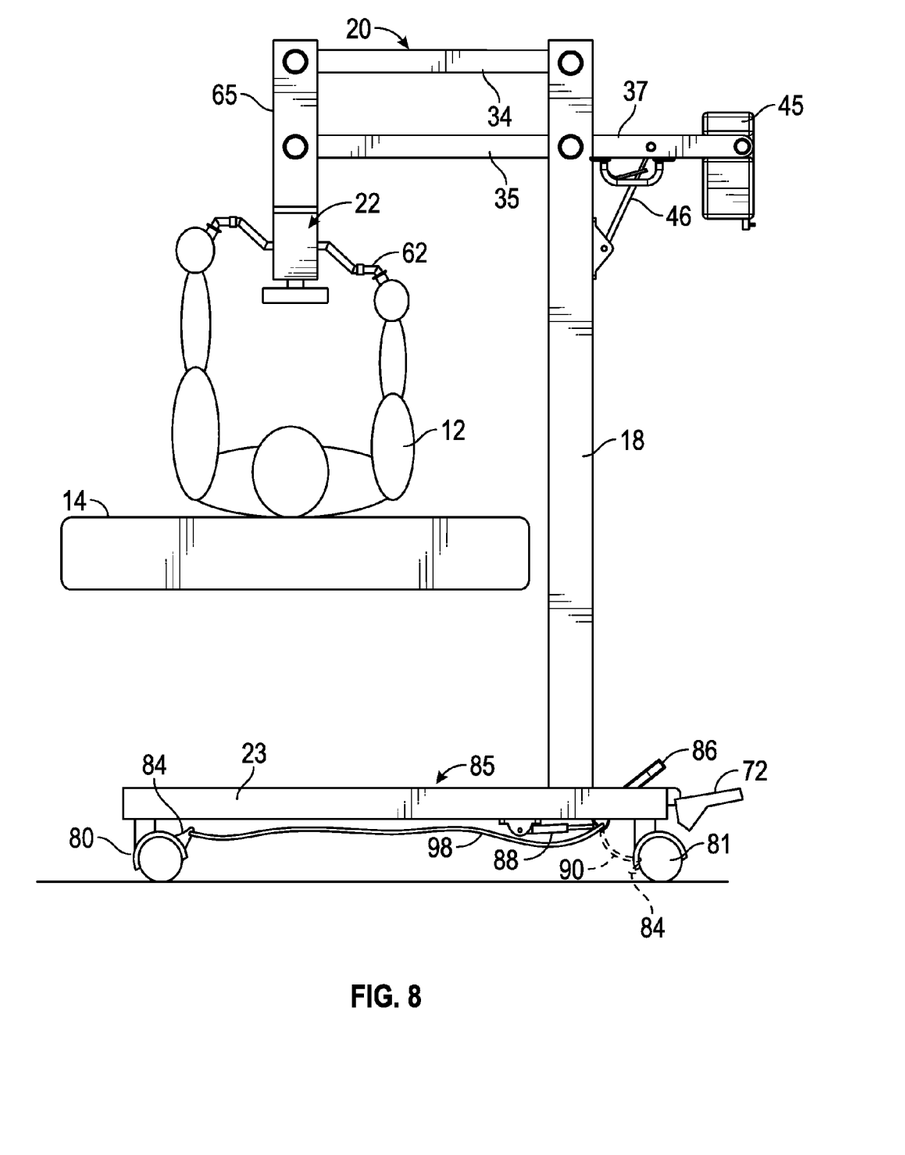
FIG. 8 is a schematic side elevation view of another embodiment of the exercise machine with a modified mobile base.

FIG. 8 illustrates a modified embodiment of the exercise machine of FIGS. 1 to 6 in which the anchoring system for the mobile base is modified. This embodiment is otherwise identical to the embodiments of FIGS. 1 to 6 and like reference numbers are used for like parts as appropriate. The mobile base 85 in this embodiment is identical to that of the first embodiment, except that the extendable feet are eliminated and the front and rear caster wheels 80, 81 are all lockable. At least the front caster wheels 80 have locks or brakes 84 which are remotely lockable, for example via a foot pedal 86 actuating hydraulic cylinder 88 linked to the brakes or locking devices 84 via lines 90, similar to the actuating mechanism for the extendable feet of the first embodiment. This allows the wheels to be locked conveniently from an accessible rear portion of the machine when the front caster wheels are under the bed. The rear wheels 81 may be lockable individually via conventional caster wheel brakes 72, as in FIG. 7. Alternatively, all four wheels may be lockable remotely as indicated in dotted outline in FIG. 8.

The exercise machine may include any exercise device or exercise equipment suitable for use by a person on bed rest who is constrained to a supine posture in a bed or who prefers to exercise in this position due to pain or other physical limitations. A hand ergometer device 22 with handles 62 is shown in the illustrated embodiment, but other exercise devices may be provided in alternative embodiments. The exercise device may be an active or passive exercise device and may be configured for performance of arm or leg exercises, depending on the physical disability of the patients for whom it is designed, and may be an aerobic exercise device or a weight lifting/strength exercise device. The exercise device may be an arm ergometer, rowing exerciser, press-up exercise device, pull down exercise device, bicep curl, chest press, shoulder press, pec fly, leg extension, leg press, leg ergometer, or the like. The exercise device can be quickly and easily positioned over the bed at the appropriate position for engagement by the user's arms or legs when performing the exercise, with the base providing a stable platform and resisting rocking or shaking of the device during exercise.

The exercise machine in the above embodiments can be used to provide suitable exercise to persons who are constrained to bed rest for extended periods of time, or for persons who are more easily able to perform exercise in this position due to physical disabilities, or who prefer to exercise in a supine position. The mobile base and upright support are designed to be extremely stable when the base is locked in position under a bed with the exercise device positioned over a user, and have sufficient structural stability to handle all or most complex movements and loading associated with exercise devices such as arm ergometers or the like. The machine is easy to move around in a hospital, care facility or the like, and can be readily positioned on either side of a bed with the mobile base extending partially under the bed. Once positioned, the extending anchors or foot pads are readily extended simply by pressing the foot pedal or another type of actuator in alternative embodiments, such as a hand lever. In some embodiments, the height of the exercise device above the patient is readily adjustable to accommodate users with different arm lengths or other different physical attributes (depending on the type of exercise device). Where height adjustment is via a four bar pivot linkage, the exercise device remains in the same orientation as it is adjusted, and a counterweight at the rear end of the pivot linkage automatically moves the exercise arm away from the patient for safety when released.

This exercise machine has advantages over prior exercise devices for use by individuals in a supine position, which were often too unstable so that the exercise device rocked or moved erratically when operated. This reduced motivation for exercise in patients constrained in a supine position for extended periods of time. The exercise machine of the above embodiments is easier to move around and more stable when the base is anchored in position, and thus is likely to be used more frequently by patients or users in a supine position, potentially improving recovery times as well as reducing boredom of extended bed rest.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

We claim:

1. An exercise machine for use by an exerciser in a supine position, comprising:
   a mobile base having a forward end and a rear end, the base having a plurality of ground-engaging wheels and an anchoring system configured to arrest movement of the base in an operative position of the exercise machine;
   an upright support extending upwards from the mobile base;
   an upper support assembly extending in a generally forward direction from the upright support;
   an exercise device suspended from the upper support assembly, and a load associated with the exercise device for adjusting exercise resistance;
   the upper support assembly comprising a four bar pivot linkage and a first actuator configured to control the four bar pivot linkage to adjust the height of the exercise device;
   the four bar pivot linkage comprising an upper portion of the upright support, a forward support extending parallel to the upper portion of the upright support, an upper pivot link having a first pivot connection to the upper portion of the upright support and a second pivot connection to the forward support, and a lower pivot link having a third pivot connection to the upper portion of the upright support below the first pivot connection and a fourth pivot connection to the forward support below the second pivot connection; and
   the forward support having a lower portion extending downwards from the four bar pivot linkage and spaced forward from the upright support;
   wherein the exercise device is located on the lower portion of the forward support and spaced below the four bar pivot linkage; and
   the mobile base is configured to extend partially under a bed with the upright support located on one side of the bed and the exercise device suspended over the bed in the operative position in which the exercise device is accessible by the exerciser in the bed to perform exercise.

2. The exercise machine of claim 1, wherein the anchoring system is configured to raise the ground-engaging wheels from the ground in the operative position of the exercise machine.

3. The exercise machine of claim 2, wherein the plurality of ground-engaging wheels comprise caster wheels, and the anchoring system comprises a plurality of expandable feet at spaced locations on the mobile base which are movable between a raised, inoperative position during transport of the machine and a lowered, ground-engaging position in which all the caster wheels are raised from the ground when the machine is in the operative position for exercise performance.

4. The exercise machine of claim 3, further comprising a second actuator configured to control actuation of the expandable feet for movement between the inoperative and ground-engaging positions.

5. The exercise machine of claim 4, wherein the second actuator comprises a foot pedal on the mobile base.

6. The exercise machine of claim 4, wherein the mobile base comprises an H-shaped frame with a pair of side bars and a cross bar extending between the side bars, the cross bar is located closer to the rear end of the mobile base than the forward end, the upright support extends upward from a central portion of the cross bar, and the second actuator comprises a foot pedal on the cross bar of the mobile base extending towards the rear end of the mobile base.

7. The exercise machine of claim 3, wherein the base has at least two spaced forward caster wheels adjacent the forward end and at least two spaced rear caster wheels adjacent the rear end, and the plurality of expandable feet comprise at least two expandable forward feet each located in the vicinity of a respective forward caster wheel.

8. The exercise device of claim 7, wherein the plurality of expandable feet further comprise at least two expandable rear feet each located in the vicinity of a respective rear caster wheel.

9. The exercise machine of claim 1, further comprising a display device mounted on or adjacent the exercise device, the display device being positioned to face the exerciser in the bed when the machine is in the operative position relative to the bed.

10. The exercise machine of claim 9, wherein the display device comprises a tablet computer.

11. The exercise machine of claim 9, further comprising an articulated arm which mounts the display device on the lower portion of the forward support and is configured for positioning of the display device on either side of the forward support.

12. The exercise machine of claim 1, wherein the exercise device comprises right and left engagement members positioned on opposite sides of the lower portion of the upper support below the four bar pivot assembly for engagement by a patient's hands or feet when in the bed, and is selected from the group consisting of an arm ergometer, a rowing exerciser, a press-up exercise device, a pull down exercise device, a bicep curl exercise device, a chest press exercise device, a shoulder press exercise device, a leg extension exercise device, a leg press exercise device, and a leg cycling exercise device.

13. The exercise machine of claim 1, further comprising an adjustment device configured for selective adjustment of the height of the exercise device above the mobile base.

14. The exercise machine of claim 1, wherein one of the pivot links has a rear portion extending rearward from the upright support, and a counterweight is mounted on the rear portion for urging the exercise device upwards and away from the exerciser when the actuator is released.

15. The exercise machine of claim 1, wherein the first actuator comprises a gas spring.

16. A method of positioning an exercise machine for use by an exerciser in a supine position in a bed, comprising:
   providing an exercise machine according to claim 1;
   positioning the mobile base of the exercise machine with at least a forward portion of the base extending under the bed while the ground-engaging wheels on the base are in a deployed, rollable condition engaging the ground, the upright support extending upwards from the mobile base located adjacent a side of the bed, the upper support assembly extending in a generally forward direction from the upper portion of the upright support, and the lower portion of the forward support on which the exercise device is located extending over the bed with the exercise device positioned over the exerciser in the bed; and
   actuating the anchoring system in the mobile base to support the base in a stable position;
   after the exerciser in the bed has completed an exercise routine using the exercise device, de-actuating the anchoring system to allow movement of the mobile base; and
   moving the mobile base away from the bed.

17. The method of claim 16, further comprising raising or lowering the exercise device using the four bar pivot linkage when the mobile base is in the stable position to place the exercise device at a selected height above the exerciser in the bed for access by the exerciser to perform exercise, and releasably locking the exercise device at the selected height.

* * * * *